US009811574B2

(12) United States Patent
Verger-Del Bove et al.

(10) Patent No.: US 9,811,574 B2
(45) Date of Patent: Nov. 7, 2017

(54) EXTRACT TRANSFORM LOAD (ETL) APPLICATIONS FOR JOB MATCHING

(71) Applicant: Work 4 Labs, Inc., San Francisco, CA (US)

(72) Inventors: Maxime Verger-Del Bove, Paris (FR); Paul Clais, Courbevoie (FR); Olivier Le Floch, San Francisco, CA (US)

(73) Assignee: Work4Labs, Inc., San Francisco, CA (US)

( * ) Notice: Subject to any disclaimer, the term of this patent is extended or adjusted under 35 U.S.C. 154(b) by 303 days.

(21) Appl. No.: 14/527,557

(22) Filed: Oct. 29, 2014

(65) Prior Publication Data

US 2015/0134592 A1    May 14, 2015

Related U.S. Application Data

(60) Provisional application No. 61/902,693, filed on Nov. 11, 2013.

(51) Int. Cl.
  *G06F 17/30* (2006.01)
(52) U.S. Cl.
  CPC .............. *G06F 17/30563* (2013.01)
(58) Field of Classification Search
  CPC .................................................. G06F 17/30563
  See application file for complete search history.

(56) References Cited

U.S. PATENT DOCUMENTS

| 9,430,114 | B1* | 8/2016 | Dingman | G06F 3/048 |
| 2002/0138670 | A1* | 9/2002 | Johnson | G06F 13/20 |
| | | | | 710/6 |
| 2004/0095400 | A1* | 5/2004 | Anderson | G06F 17/30905 |
| | | | | 715/864 |
| 2009/0177671 | A1* | 7/2009 | Pellegrini | G06F 9/5038 |
| 2009/0228297 | A1* | 9/2009 | McGovern | G06Q 10/10 |
| | | | | 705/320 |
| 2012/0102007 | A1* | 4/2012 | Ramasubramanian | |
| | | | | G06F 17/30563 |
| | | | | 707/705 |
| 2014/0007121 | A1* | 1/2014 | Caufield | G06F 9/4843 |
| | | | | 718/103 |
| 2014/0136472 | A1* | 5/2014 | Frafjord | G06F 17/30563 |
| | | | | 707/602 |
| 2014/0297550 | A1* | 10/2014 | Miller | G06Q 10/1053 |
| | | | | 705/321 |

* cited by examiner

*Primary Examiner* — Richard Bowen
(74) *Attorney, Agent, or Firm* — Perkins Coie LLP

(57) ABSTRACT

Various of the disclosed embodiments present systems and methods for generating consolidated job postings from disparate originating sources and formats. Applying an Extraction Transform Load (ETL) framework to the incoming data, a parallel and asynchronous as well as scalable approach to distributing job posting information is presented. "Extraction" may involve the recognition of salient information in the disparate formats (e.g., in employment listings on company webpages). During "transformation", the information may be reformatted into a universal format or into a format suitable for use at a given destination system. During "loading", the reformatted data may be supplied to a suitable destination system, e.g., the Application Programming Interface (APIs) of a job board system. Applications in related domains and various optimizations are also discussed.

18 Claims, 6 Drawing Sheets

EXTRACT TRANSFORM LOAD (ETL) APPLICATIONS FOR JOB MATCHING

CROSS REFERENCE TO RELATED APPLICATIONS

This application claims the priority and benefit of U.S. Provisional Patent Application No. 61/902,693, entitled "ETL SYSTEM FOR JOB POSTING", filed Nov. 11, 2013 the contents of which are incorporated by reference herein in their entirety for all purposes.

BACKGROUND

While the Internet has increased access both to job openings and to potential candidates, job posting information is rarely consolidated into a form suitable for widespread dissemination and use. For example, job postings may appear in a wide variety of formats, providing disparate levels of detail regarding the position under consideration and the desired applicant attributes. Manually iterating through each of these postings to consolidate them in a centralized form, or into forms accessible by many different destination systems, is often intractable. However, requiring recruiters to revise their postings every time they wish to provide a listing on a different service is likewise unfeasible. Accordingly, there exists a need for automated methods to consolidate posting information for presentation across disparate systems.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
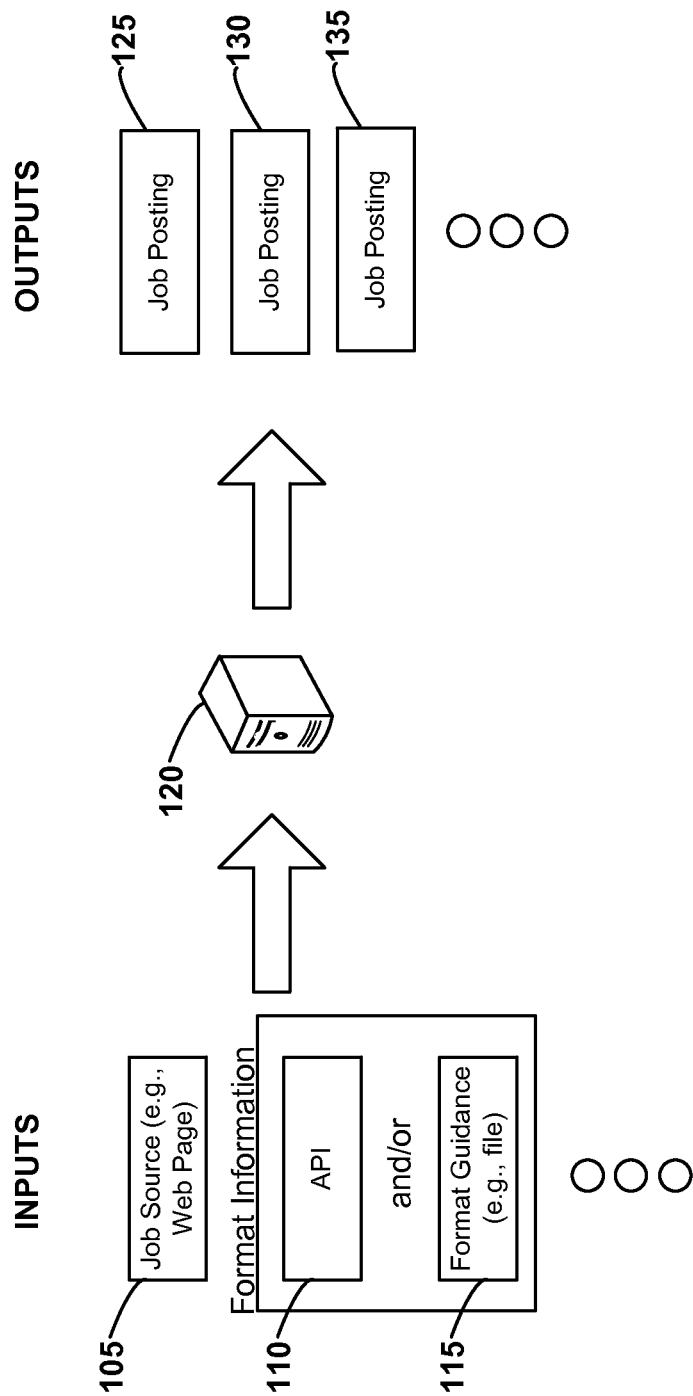
FIG. 1 is a block diagram illustrating a system for generating consolidated job postings using an Extraction Transform Load (ETL) process as may be implemented in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments.

DETAILED DESCRIPTION

Various of the disclosed embodiments present systems and methods for generating consolidated job postings from disparate originating sources and formats. Applying an Extraction Transform Load (ETL) framework to the incoming data, a parallel and asynchronous as well as scalable approach to distributing job posting information is presented. "Extraction" may involve the recognition of salient information in the disparate formats (e.g., in employment listings on company webpages). During "transformation", the information may be reformatted into a universal format or into a format suitable for use at a given destination system. During "loading", the reformatted data may be supplied to a suitable destination system, e.g., the Application Programming Interface (APIs) of a job board system. Applications in related domains and various optimizations are also considered.

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

Overview—Example System Topology

FIG. 1 is a block diagram illustrating a system for generating consolidated job postings using an Extraction Transform Load (ETL) process as may be implemented in some embodiments. An ETL system 120 may receive a plurality of inputs, including, e.g., a source of job information 105 (e.g., a web page such as a career page regrouping a list of job postings) including job posting information, an Application Programming Interface (API) specification 110, and a format guidance 115 specifying the character of the output. The web page 105, specification 110, and/or format guidance 115, may be specified by an administrator. The API specification 110 and/or format guidance 115 may specify the character of the job posting information to be generated. For example, the administrator may wish to consolidate job posting information into forms recognizable by different job board system APIs. The API specification 110 may specify the requirements for the API system to interpret the job posting and the format guidance 115 may specify how various values are to be reflected in the API readable format.

Thus the ETL system 120 may generate a plurality of reformatted job postings 125, 130, 135 accessible by one or more APIs. Though APIs are discussed in this example, any "output source" may be anticipated. For example, some job boards may expect the information in a XML file, in JSON format, in a dynamic linked library (DLL), etc. While the inputted information may be a an HTML webpage or a URL, such as may be found on a company career site, other inputs may also be provided (e.g., white pages, other job board listings, social network listings, a comma separated value file, a database file, etc.).

Depending on the inputs, the extraction tools applied by the ETL system 120 may be different. For example, where the job source input 105 is an HTML page, the ETL system 120 may apply a customized extractor for HTML pages. In some instances, the ETL system 120 can detect the input's structure and formatting upon receipt and attempt to select the appropriate extractor. In some other instances, the job source input 105 is an XML structured file with a complete list of job postings with associated attributes. In this case as well, the ETL system 120 can automatically detect the XML file structure and define the proper extractor.

ETL System Structure

Figure 2:
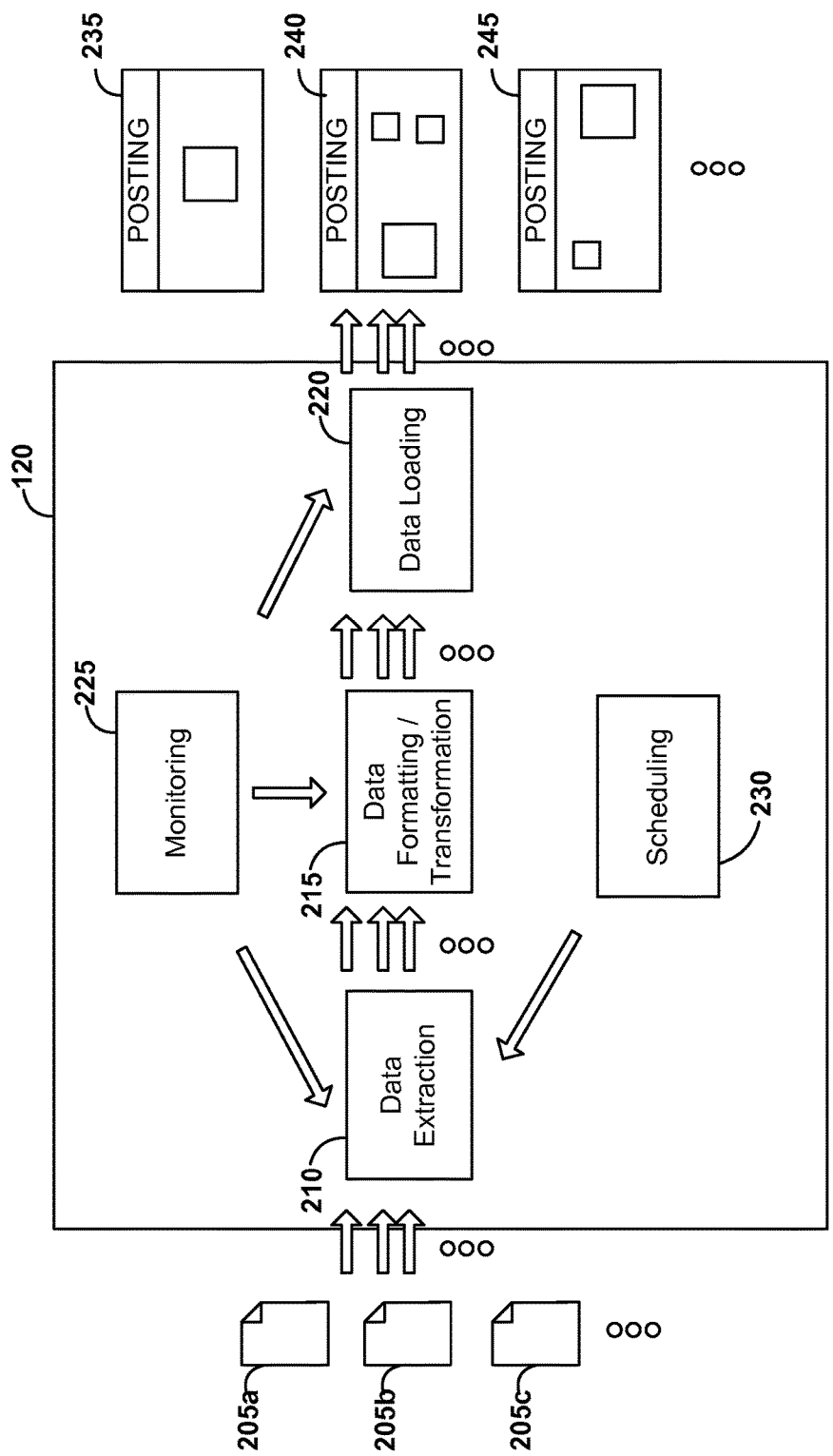
FIG. 2 is a block diagram illustrating various components in an ETL system to generate job postings as may be implemented in some embodiments.

FIG. 2 is a block diagram illustrating various components in an ETL system to generate job postings as may be implemented in some embodiments. Collections 205a, 205b, and 205c of job posting and formatting information may be provided to the ETL system 120. Within the ETL system 105, a data extraction module 210 may extract data identified in the source information for each collection 205a, 205b, and 205c. Data formatting module 215 may then convert the extracted fields into a universal format, or directly into each of the formats desired for loading on the destination systems. The data loading module 220 may then prepare the universal format fields in the postings into a form suitable for the designated job boards (e.g., an XML file, a database file, a specific API format, etc.), or may simply load the values into the destinations if they are already in a suitable form. The modules may be firmware, hardware, or software as understood in the art. Thus, the resultant posting datasets 235, 240, 245 may be accessible to different job board APIs.

There may be a one-to-many relationship in the operations of the data loading module 220. For example, the collection 205a may specify that the data in a single source is to be reformatted for many different APIs. Thus, certain of the downstream modules may handle higher loads than their upstream counterparts. In some embodiments, there may be a many-to-one relationship in the operations of the data extraction module 210. Multiple data source sets may be used as input to one data extractions module.

A scheduling module 230 may be used to specify that job extraction is to be performed multiple times a day. This may regularly capture updates to posting information (e.g., that the posting has been closed or modified from its original content). The scheduling may be adapted to better suit job source refreshing frequency (e.g., on the order of once a minute to once a week).

A monitoring module 225 may allow a system administrator (e.g., a human or a monitoring process) to follow in real time the extraction, formatting and loading processes for each source. Where many sources are being handled and many output formats being considered, it may take longer periods of time to consolidate different inputs. The administrator can dynamically reprioritize operations at each of the data extraction module 210, the data formatting module 215, and the data loading module 220. Errors may be raised, logged, and displayed in real-time in the monitoring module 225 interface so that an operator can take immediate actions on the system. By adapting the parallel processing of multiple inputs at various times, an administrator, or the system 120 operating upon the administrator's guidance, can provide more meaningful posting datasets 235, 240, 245 in accordance with a larger strategic objective. For example, the administrator may desire to implement a plurality of business rules for processing. One business rule may specify that if a job posting permits multiple applicants (e.g., as there are multiple instances of the position to be filled) it should receive prioritized extraction, formatting and loading. Once most of those positions are filled, however, formatting and loading may be less prioritized, though extraction may continue to be highly prioritized so that applicants will be notified when the position is fully closed. Data at each of the modules may be timestamped so that the module will use the most recent data once it resumes operation (e.g., after its thread finishes yielding).

Data Formatting

Figure 3:
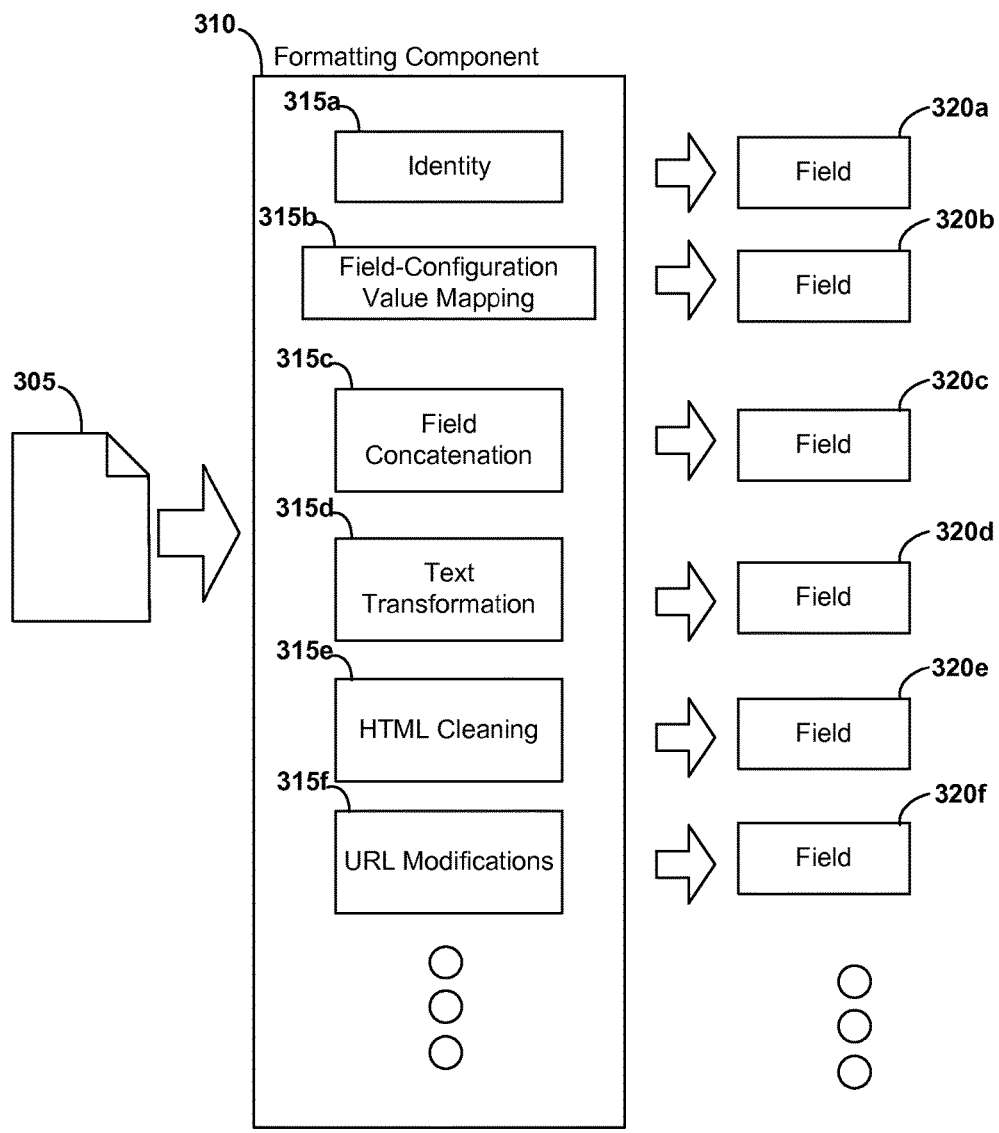
FIG. 3 is a block diagram illustrating various components in a formatting component used to generate job postings as may be implemented in some embodiments.

FIG. 3 is a block diagram illustrating various components in a formatting component 310 used to generate job postings as may be implemented in some embodiments. The formatting component may appear, e.g., as part of the data formatting module 215.

The formatting component 310 may receive a source input 305 including, e.g., a web page and formatting guidance. The formatting component 310 may include separate functions to perform formatting operations so as to generate universal or destination customized field values 320a-f. The universal format may include a number of these pre-defined fields, selected to facilitate placement in multiple output formats. In some embodiments, the intermediate universal form may not be generated explicitly and the identified fields may be immediately prepared in a form suitable for a specified API.

An identity transformation function 315a may reformat, e.g., the organization name into a form facilitating unique identification as a field 320a in the destination posting system. However, in some embodiments the identity transformation function 315a may leave the data completely untouched, e.g., pass the values "as is" as a field 320a in the destination posting system. A field configuration value mapping function 315b may transform configuration values into a field 320b suitable for a destination posting system. For example, an original job posting may emphasize some job features over others via highlighting, whereas the destination 320b may instead reflect such emphasis with bold and underline. In some instances, a text transformation function 315d may assist with this process, compensating for bolding, uppercasing, lowercasing, to stylize the content appropriately.

A field concatenation function 315c may combine fields as necessary. For example, an original job posting may specify a drop-down list of location options, whereas the destination 320b may require the options in a concatenated list.

An HTML cleaning function 315e may substitute formatted text for various Document Object Model (DOM) components to produce suitable fields 320e in the destination system. URL modifications function 315f may similarly adjust links to ensure that the links may be accessed from the target job board. For example, where a source web page references content relative to its internal directory structure, URL modifications function 315f may substitute absolute references to ensure that the data can be accessed after transformation. Variables in POST and GET requests may likewise be added to the field 320f to ensure the desired access.

Other transformations may include and are not restricted to: An identification transformation function 315g which may reformat, e.g., the organization name into a form facilitating unique identification as a field 320g in the destination posting system; a geolocation transformation function which may transform raw data values with geographical information into formatted GPS coordinates as well as City, State and Country values; a filter transformation where values are ordered and filtered out of some values of the set; a regular expression ("regex") transformation where a regular expression is defined by the administrator in order to transform values; a constant transformation where the output value is constant regardless of the input; etc. Once the newly formatted fields are created, they may then be serialized into the format expected by the target API.

ETL Implementation Details

Figure 4:
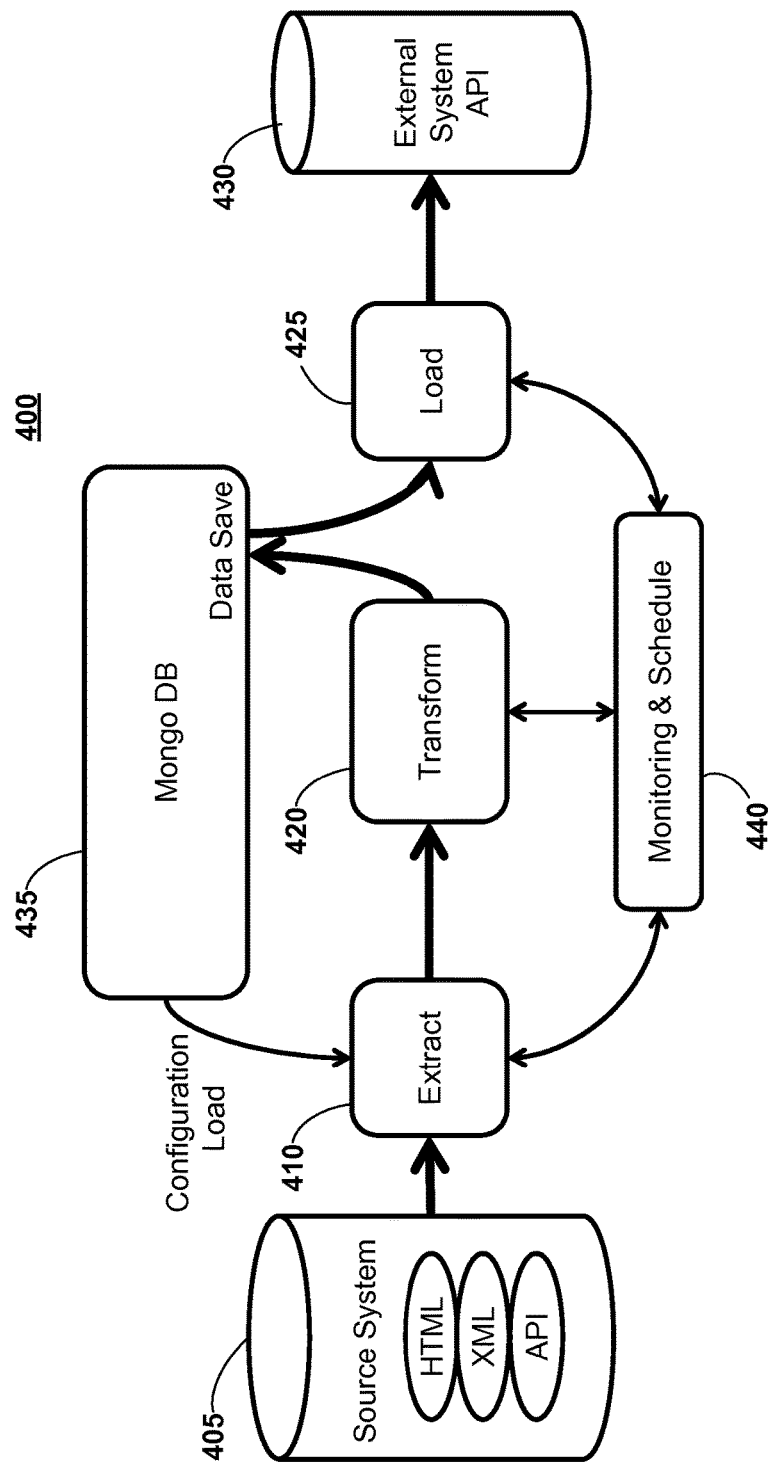
FIG. 4 is a block diagram illustrating various components in an example ETL system implementation to generate job postings as may be implemented in some embodiments.

FIG. 4 is a block diagram illustrating various components in an example ETL system implementation 400 to generate job postings as may be implemented in some embodiments. In this implementation, the source information may be provided by a source system 405, with the source information in HTML, the format information in XML, and a list indicating the desired output API formats. Extract 410, Transform 420, and Load 425 modules may operate as described above, under the guidance of a monitoring and scheduling component 440. In this implementation, the outputted fields may be provided directly to the relevant external APIs 430, e.g., an external job board website. In this implementation, an opensource document database, Mongo™ 435, may be used to store intermediate results from the transform module 420 prior to their export via the loading module 425. Mongo™ 435 may also be used to store configuration information (e.g., the scheduling details) for the extraction module 410.

In some embodiments, the ETL system is optimized to facilitate asynchronous processing and parallelism. In some embodiments, each part of the ETL process is asynchronous. This can make the system more flexible, resilient and scalable. Job information may be extracted, formatted and loaded in parallel by different processes (e.g., different threads). In this manner, the number of sources handled may not be limited of the system as machine duplication can be instrumented very easily.

ETL Process Flow

Figure 5:
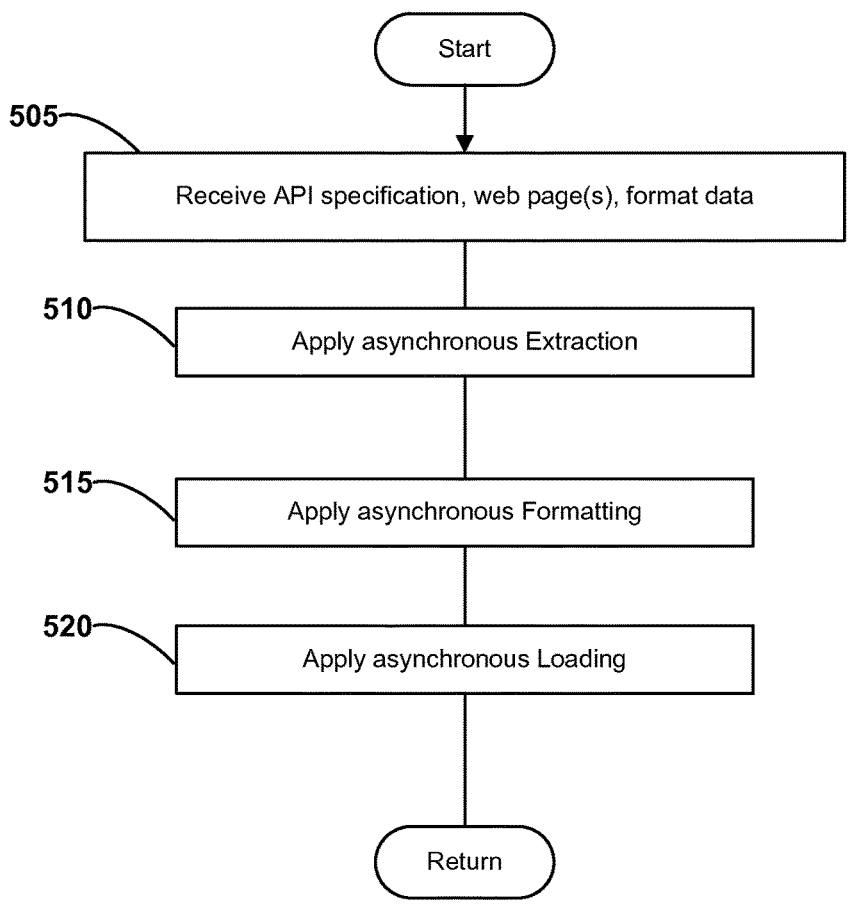
FIG. 5 is a flow diagram illustrating a process for generating consolidated job postings using an ETL framework as may be implemented in some embodiments.

FIG. 5 is a flow diagram illustrating a process 500 for generating consolidated job postings using an ETL framework as may be implemented in some embodiments. At bock 505, the ETL system may receive one or more collections of a specified API, a job source (e.g., a webage), and formatting data. The system may then asynchronously extract 510, format 515, and load 520 the data into the various job boards.

Additional Domains

While the above embodiments have been described in relation to job postings, and even if most extract modules are heavily linked to job postings and their usual formats for the industry, various of the disclosed approaches may be applied in other domains, e.g., transferring personal ads in an online dating context, classified listings, etc.

Computer System

Figure 6:
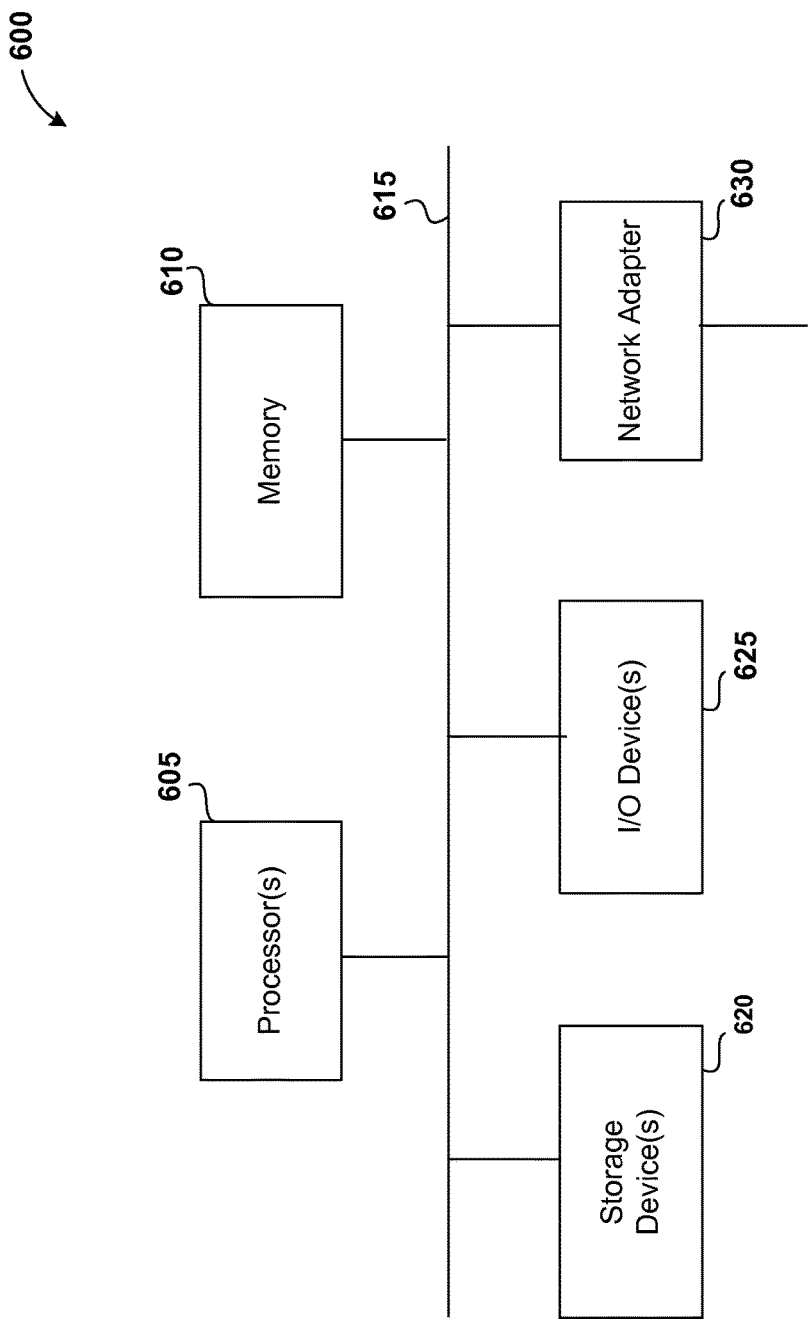
FIG. 6 is a block diagram of a computer system as may be used to implement features of some of the embodiments.

FIG. 6 is a block diagram of a computer system as may be used to implement features of some of the embodiments. The computing system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 610 and storage devices 620 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 610 can be implemented as software and/or firmware to program the processor(s) 605 to carry out actions described above. In some embodiments, such software or firmware may be initially provided to the processing system 600 by downloading it from a remote system through the computing system 600 (e.g., via network adapter 630).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method for presenting job information to a plurality of job posting systems, comprising:
    receiving a source content;
    responsive to receiving the source content, detecting a file structure or structure and formatting of the source content;
    responsive to detecting the file structure or structure and formatting of the source content, selecting an appropriate extractor based on the detected structure of the source content;
    receiving an indication of the plurality of systems on which to post job content;
    extracting, using the selected extractor, transforming, and loading the source content to a first system of the plurality of job posting systems;
    extracting, using the selected extractor, transforming and loading the source content to a second system of the plurality of job posting systems, wherein the extracting, transforming, and loading of the source content to the second system occurs in parallel with the extracting, transforming, and loading of the source content to first system;
    presenting a progress indication for the extracting, transforming and loading for the first and second system at an interface;
    monitoring in real-time, by a monitoring processor, the extraction, transforming, and loading processes for the source content at each of the first and second systems, and, based on the real-time monitoring results, reprioritizing operations of the extraction, transforming, and loading processes at any of or both of the first and second systems.

2. The computer-implemented method of claim 1, wherein transforming source content comprises reformatting the content in a universal format.

3. The computer-implemented method of claim 1, wherein transforming source content comprises applying a field concatenation operation to portions of the content.

4. The computer-implemented method of claim 1, wherein transforming source content comprises converting a relative reference URL to an absolute reference URL.

5. The computer-implemented method of claim 1, wherein loading comprises providing data to a job board API.

6. The computer-implemented method of claim 1, the method further comprising receiving a prioritization command for one of the extracting, transforming and loading operations for the first system or deferring the loading to the first system in favor of loading to the second system.

7. A non-transitory computer-readable medium comprising instructions configured to cause at least on processor to perform a method comprising:
    receiving a source content;
    responsive to receiving the source content, detecting a file structure or structure and formatting of the source content;
    responsive to detecting the file structure or structure and formatting of the source content, selecting an appropriate extractor based on the detected structure of the source content;
    receiving an indication of the plurality of systems on which to post job content;
    extracting, using the selected extractor, transforming, and loading the source content to a first system of the plurality of job posting systems;
    extracting, using the selected extractor, transforming and loading the source content to a second system of the plurality of job posting systems, wherein the extracting, transforming, and loading of the source content to the second system occurs in parallel with the extracting, transforming, and loading of the source content to first system;
    presenting a progress indication for the extracting, transforming and loading for the first and second system at an interface;
    monitoring in real-time, by a monitoring processor, the extraction, transforming, and loading processes for the source content at each of the first and second systems, and, based on the real-time monitoring results, reprioritizing operations of the extraction, transforming, and loading processes at any of or both of the first and second systems.

8. The non-transitory computer-readable medium of claim 7, wherein transforming source content comprises reformatting the content in a universal format.

9. The non-transitory computer-readable medium of claim 7, wherein transforming source content comprises applying a field concatenation operation to portions of the content.

10. The non-transitory computer-readable medium of claim 7, wherein transforming source content comprises converting a relative reference URL to an absolute reference URL.

11. The non-transitory computer-readable medium of claim 7, wherein loading comprises providing data to a job board API.

12. The non-transitory computer-readable medium of claim 7, the method further comprising receiving a prioritization command for one of the extracting, transforming and loading operations for the first system or deferring the loading to the first system in favor of loading to the second system.

13. A computer system comprising:
at least one processor;
at least one memory comprising instructions configured to cause the at least one processor to perform a method comprising:
receiving a source content;
responsive to receiving the source content, detecting a file structure or structure and formatting of the source content;
responsive to detecting the file structure or structure and formatting of the source content, selecting an appropriate extractor based on the detected structure of the source content;
receiving an indication of the plurality of systems on which to post job content;
extracting, using the selected extractor, transforming, and loading the source content to a first system of the plurality of job posting systems;
extracting, using the selected extractor, transforming and loading the source content to a second system of the plurality of job posting systems, wherein the extracting, transforming, and loading of the source content to the second system occurs in parallel with the extracting, transforming, and loading of the source content to first system;
presenting a progress indication for the extracting, transforming and loading for the first and second system at an interface;
monitoring in real-time, by a monitoring processor, the extraction, transforming, and loading processes for the source content at each of the first and second systems, and, based on the real-time monitoring results, reprioritizing operations of the extraction, transforming, and loading processes at any of or both of the first and second systems.

14. The computer system of claim 13, wherein transforming source content comprises reformatting the content in a universal format.

15. The computer system of claim 13, wherein transforming source content comprises applying a field concatenation operation to portions of the content.

16. The computer system of claim 13, wherein transforming source content comprises converting a relative reference URL to an absolute reference URL.

17. The computer system of claim 13, wherein loading comprises providing data to a job board API.

18. The computer system of claim 13, the method further comprising receiving a prioritization command for one of the extracting, transforming and loading operations for the first system or deferring the loading to the first system in favor of loading to the second system.

* * * * *